United States Patent Office 2,947,717
Patented Aug. 2, 1960

2,947,717

EPOXIDE RESIN COMPOSITIONS

William J. Belanger and John E. Masters, Louisville, Ky., assignors to Devoe & Raynolds Co., Inc., a corporation of New York No Drawing. Filed June 11, 1956, Ser. No. 590,419

6 Claims. (Cl. 260—45.4)

This invention relates to novel resinous compositions. In one of its aspects the invention relates to resin compositions which are derived from epoxide compounds, or polyepoxides. In another of its aspects the invention pertains to methods for the preparation of these novel resins.

A great deal of research has been directed toward the production of epoxide resins since these substances have been found to be valuable compositions for use in the manufacture of varnishes, molding resins, adhesives, films and the like.

It is known that these epoxide resins, obtained as a product of reaction of a dihydric compound, such as a dihydric phenol, and an epihalohydrin, can be converted to thermosetting resins by the use of polybasic carboxylic acid anhydrides. It is known, for example, that hard thermosetting resins are obtained by condensing certain epoxide resins with phthalic acid anhydride. This invention has as an object the provision of modified polybasic acid anhydride cured epoxide resins. The invention also relates to the production of fusible, soluble resins resulting from the modification of the polybasic anhydride-epoxide reaction mixture, the modified reaction mixture being capable on heating of forming an insoluble, infusible cured resin.

Theoretically one mol of a diepoxide would require two mols of a dibasic acid anhydride in order to obtain the maximum degree of cross-linking. However, when a dibasic acid anhydride is caused to react in the ratio of two mols of the dibasic acid anhydride to one mol of expoxide the high degree of cross-linking yields a resin whose utility is limited by its brittleness. Hence, less than a two to one anhydride to diepoxide mol ratio is generally used. A ratio of less than two to one, however, does not result in the highest degree of cure. This invention is based on the discovery that, using glycidyl polyethers, when the reaction mixture is modified by the addition of a third ingredient, two mols of anhydride per mol of epoxide can be used, obtaining a highly cured resin, but without the high degree of brittleness. The modified reaction mixture results in a modified anhydride cured epoxide resin.

In accordance with an embodiment of this invention the modified resins contemplated are prepared by the use of a low molecular weight dihydroxy alcohol as the modifying agent, for example, 2-ethylhexanediol-1,3, ethylene glycol, 2-ethylhexanediol, propylene glycol, trimethylene glycol, diethylene glycol, triethylene glycol, and dipropylene glycol. A wide variety of dihydric alcohols can be used. Various examples are 1,5-pentanediol, decamethylene glycol, and dihydroxyethyl, dihydroxybutyl, and dihydroxybutyl ethers of dihydric phenols. By low molecular weight dihydroxy alcohols, alcohols having molecular weights of less than 600 are intended. The invention also includes dihydroxy cycloaliphatic alcohols, and aromatic compounds having side substituents containing two alcoholic hydroxyl radicals, e.g., 2,2-bis(p-2-hydroxy,1-propoxyphenyl)propane, and 2,2 - bis(p-2-hydroxy,1-methylpropoxyphenyl)propane, as well as polyethylene glycols having average molecular weights of 200, 300, 400 etc. Low molecular weight ether-alcohols are also intended, for example, glycol ethers having molecular weights averaging less than 600, e.g., the reaction product of two mols of phenyl glycidyl ether and one mol of bisphenol. Also included are partial esters containing two free hydroxyl groups such as monoglycerides, the reaction product of one mol of pentaerythritol with two mols of a monobasic acid, etc.

Thus in one of its aspects this invention provides for the preparation of cured resinous compositions by the reaction of a glycidyl polyether containing more than one epoxide group per molecule and having a weight per epoxide below 1000, a polybasic acid anhydride, and a dihydric alcohol having a molecular weight below 600. Normally, when these three ingredients are reacted, an elevated temperature is employed, for example, a temperature sufficient to dissolve in the glycidyl polyether, the polybasic acid anhydride. In other words, the mixture of a polybasic acid anhydride, a dihydric alcohol and a glycidyl polyether are heated together until a clear melt is obtained. The mixture is then cured by further heating to obtain compositions which are hard, tough resins having an extremely broad range of usefulness, for example, in the potting and casting fields.

It is to be understood, however, that it is not necessary to use the dihydric alcohol per se so long as the alcohol is incorporated into the final resin. For instance, it is possible to mix the acid anhydride, the dihydric alcohol, and the glycidyl polyether and heat the reaction mixture to form a resin of this invention. It is also contemplated that the dihydric alcohol, either completely or partially esterified with the acid, can be used along with additional acid anhydride to form resins of this invention. As an example, it is possible to react glycidyl polyether and acid anhydride with a product formed by the reaction of one mol of a dibasic acid anhydride with one mole of dihydric alcohol, that is the half ester. Another method of making the resin of this invention is to react the completely esterified dihydric alcohol with glycidyl polyether and additional acid anhydride. In other words, the product resulting from the reaction of two mols of a dibasic acid anhydride with one mol of the dihydric alcohol can be reacted with glycidyl polyether and additional acid anhydride to form a resin of this invention. Summarizing, there are three methods by which resins of this invention can be made. A dihydric alcohol, acid anhydride, and a glycidyl polyether can be combined. The polybasic acid anhydride half ester of the dihydric alcohol can be combined with acid anhydride and glycidyl polyether, or the completely esterfied dihydric alcohol can be reacted with acid anhydride and glycidyl polyether in accordance with this invention.

It is considered that the reaction taking place when the glycidyl polyether, the dihydric alcohol, and the polybasic acid anhydride are combined is not merely the reaction with glycidyl polyether of a diester of the dibasic alcohol, having two free carboxyl groups, for example, as prepared by the reaction of two mols of phthalic acid or anhydride with one mol of a dihydric alcohol. When such an ester is reacted with a glycidyl polyether a reaction, preferentially, takes place between a free carboxyl group and an epoxide group. Hence, if an ester having two free carboxyl groups is reacted with a diglycidyl polyether the resulting product will theoretically be a linear polymer, since both reactants are difunctional or less than difunctional.

The reaction of this invention differs from the known use of esters particularly because in accordance with this invention the polybasic acid anhydride is present beyond that required to react with the dihydric alcohol. Therefore, excess polybasic acid anhydride acts as a cross-linking agent. An acid anhydride will not react with the epoxy groups, but preferentially will react with a hydroxyl group. Hence, when the polybasic acid anhydride is present beyond that required to react with the dihydric alcohol, it will react with a hydroxyl group, either present in the glycidyl polyether, or formed by the previous reaction of an epoxide group with a carboxyl group. The polybasic acid anhydride, having reacted with a hydroxyl group, now contains a free carboxyl group which itself can react with another epoxy group, thus providing another hydroxyl group which is free to react with additional polybasic acid anhydride. Through this reaction a cross-linked polymer is formed which does not result from the reaction with glycidyl polyether of merely a diester of a dihydric alcohol having two free carboxyl groups.

It has been pointed out that per mol of glycidyl polyether more than one mol of, say, a dibasic acid anhydride can be employed if a dihydric alcohol is used in accordance with this invention. In the case of glycidyl polyether, however, it is perhaps better to use epoxide equivalents. The epoxide equivalent represents the weight of the product per epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for 20 minutes and back titrating the excess of pyridine hydrochloride with 0.1 N sodium hydroxide using phenolphthalein as indicator, and considering one HCl as equivalent to one epoxide group. Throughout this description the molecular weight of the glycidyl polyether is assumed to be two times the weight per epoxide. Molecular weight determinations can, however, be made by a standard boiling point elevation method. In some cases, the molecular weight values correspond to the theoretical values for a straight chain polymer. In other cases, however, a higher molecular weight value is obtained, seemingly indicating a more complex structure.

The quantities of glycidyl polyether, polybasic acid anhydride, and dihydric alcohol employed in the practice of this invention can probably best be expressed as ratios of glycidyl polyether to polybasic acid anhydride to dihydric alcohol, wherein the glycidyl polyether is expressed in epoxide equivalents, the polybasic acid anhydride in anhydride equivalents, and wherein the dihydric alcohol is expressed in mols. Since two epoxide equivalents are approximately equal to one mol of a diepoxide, two equivalents of glycidyl polyether are used in the expression rather than one equavilent. An anhydride equivalent represents the weight of the acid anhydride, generally in grams, per anhydride group. Thus, by two anhydride equivalents is intended two times the weight per anhydride. It has been found that the three reactants desirably can be reacted in a ratio of two epoxide equivalents of glycidyl polyether, to one to two equivalents of polybasic acid anhydride, to 0.01 to 0.7 mol dihydric alcohol. A maximum amount of dihydric alcohol has been found generally to be two epoxide equivalents glycidyl polyether to two equivalents of anhydride to about 0.7 mol dihydric alcohol. Resins can, of course, be prepared using more than 0.7 mol dihydric alcohol for each two epoxide equivalents, but in many cases they are less desirable. Obviously, excellent cures are obtained using lower quantities of dihydric alcohol. For example, a desirable ratio of glycidyl polyether to polybasic acid anhydride to dihydric alcohol is 2:1 to 2:0.10 to 0.50, wherein the epoxide and anhydride are expressed in equivalents and the dihydric alcohol is expressed in mols. A simplified ratio of glycidyl polyether to polybasic acid anhydride to dihydric alcohol for use when the amount of dihydric alcohol is 0.5 or less mol per two epoxide equivalents is $2:1+2z:z$, wherein the glycidyl polyether and polybasic acid anhydride are expressed in equivalents and the dihydric alcohol is expressed in mols, and wherein $z$ is a figure not exceeding 0.5 representing mols of dihydric alcohol per two epoxide equivalents. For example, when it is desired to use 0.4 mol dihydric alcohol for two epoxide equivalents of glycidyl polyether, $z$ will be 0.4 and the amount of anhydride per two epoxide equivalents of glycidyl polyether will be $1+2z$ or $1+(2\times0.4)$ or 1.8 equivalents of a polybasic acid anhydride (1.8 mols of a dibasic acid anhydride) for two epoxide equivalents of glycidyl polyether. Assuming that one mol of a glycidyl polyether is equal to two times the weight per epoxide (two epoxide equivalents), the ratio of glycidyl polyether to dibasic acid anhydride to dihydric alcohol will be one mol glycidyl polyether to 1.8 mols anhydride to 0.4 mol dihydric alcohol.

The general procedure for preparing resin compositions in accordance with this invention is to mix the glycidyl polyether, the polybasic acid anhydride, and the dihydric alcohol and to heat the mixture, with stirring, until a homogeneous mixture is obtained. To obtain this homogeneous mixture the amount of heat required generally is sufficient to dissolve the phthalic or other polybasic acid anhydride in the glycidyl polyether. This temperature is about 80° C. and is adjusted to afford a means for controlling the reaction rate. In any case, the temperature should not be sufficiently high to cause premature gelation. The homogeneous mixture can then, if desired, be poured into a container of desired shape and heated to obtain the cure. Excellent cures are obtained by the use of an alkaline catalyst, but the reaction is not limited to the use of such a catalyst.

As indicated, this invention is applicable to glycidyl polyethers containing more than one epoxide group per molecule and having a weight per epoxide below 1000. Desirable glycidyl polyethers are glycidyl polyethers of polyhydric phenols or polyhydric alcohols. Such glycidyl polyethers are generally produced by the reaction of epichlorhydrin or glycerol dichlorhydrin with dihydric phenols, polyhydric phenols or polyhydric alcohols generally in the presence of a condensing agent, for example, caustic alkali.

The products resulting from the reaction of a polyhydric alcohol or polyhydric phenol with epichlorhydrin or glycerol dichlorhydrin are monomeric and straight chain polymeric products characterized by the presence of at least one terminal epoxide group. Monomeric polyglycidyl polyethers include the glycidyl polyethers of polyhydric phenols obtained by reacting in an alkaline medium a polyhydric phenol with an excess, e.g., 4 to 8 mol excess, of an epihalohydrin. Thus, a polyether which is substantially 2,2-bis(2,3-epoxypropoxyphenyl)propane is obtained by reacting bisphenol 2,2-bis(4-hydroxyphenyl)propane with an excess of epichlorhydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxy-benzophenone, bis(4-hydroxyphenyl)ethane, and 1,5-dihydroxynaphthalene. The epihalohydrins can be further exemplified by 3-chloro-1,2-epoxybutane, 3-bromo-1,2-epoxyhexane, 3-chloro-1,2-epoxyoctane and the like.

One class of straight chain polymeric glycidyl polyethers is produced by the reaction of a polyhydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary from about one mol bisphenol to 1.2 mol epichlorhydrin or glycerol dichlorhydrin to about 1 mol bisphenol to 1.5 mol epichlorhydrin or glycerol dichlorhydrin as set forth in U.S. Patent 2,615,007. In addition, sufficient caustic alkali is employed to combine with the chlorine atoms of the epichlorhydrin or glycerol dichlorhydrin.

Another group of polymeric glycidyl polyethers is produced by the reaction of a dihydric phenol such as bisphenol with epichlorhydrin in the proportions of about 2 mols of epichlorhydrin to about 1 mol of bisphenol and with the use of caustic alkali in amounts sufficient to combine with the chlorine of the epichlorhydrin. Such glycidyl polyethers are described in U.S. Patent 2,582,985.

Included are polyepoxypolyhydroxy polyethers obtained by reacting epichlorhydrin or glycerol dichlorhydrin with a mononuclear polyhydric phenol such as resorcinol, hydroquinone, catechol, phloroglucinol, etc., or a polynuclear phenol, such as bisphenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers.

Another group of polymeric glycidyl polyethers which can be used in accordance with this invention results from the reaction, generally in alkaline or acid medium, of a polyhydric alcohol or polyhydric phenol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methyl-propyl)ether, the reaction product of pentaerythritol and 1,2-epoxy-4,5-epoxy-pentane, and the reaction product of bisphenol and bis(2,3-epoxy-2-methyl-propyl)ether, the reaction product of resorcinol and bis(2,3-epoxypropyl)ether, a reaction product using catechol, etc. The process for preparing polyepoxypolyhydroxy polyethers of this group is disclosed in U.S. Patent 2,615,008.

As indicated hereinbefore, polyhydric alcohols can be used in the preparation of glycidyl polyethers as well as polyhydric phenols. As set forth in U.S. Patent 2,581,464, these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, subsequently treating the resulting product with an alkaline compound.

The polybasic acid anhydrides useful in preparing the resin compositions of this invention contain one or more anhydride groups. As set forth in describing the reactions applicable to this invention, one reaction involved is that between the anhydride group and a hydroxy radical, the anhydride employed being in excess of that equivalent to, or required to react with the glycol. In fact, the use of the diester of a glycol, containing free carboxyl groups in combination with a polybasic acid anhydride is considered within the scope of this invention. Polybasic acid anhydrides applicable to this invention include both aliphatic and aromatic polycarboxylic anhydrides, either saturated or unsaturated, for example, succinic, adipic, maleic, tricarballyic, phthalic, pyromellitic anhydrides. Endo-cis-bicyclo-(2,2,1)-5-heptene-2,3-dicarboxylic anhydride (sold under the trademark "Nadic" anhydride), 1,4,5,6,7,7-hexachlorobicyclo-(2,2,1)-5-heptene-2,3-dicarboxylic anhydride (sold under the trademark "Chlorendic" anhydride) are also desirable. Preferred polybasic acid anhydrides are the anhydrides of dicarboxylic acids, preferably phthalic acid anhydride. The acid anhydrides, which are produced by diene syntheses can also be used, for instance, the acid anhydrides which are derived from eleostearic acid-glyceride and maleic acid anhydride, also those of maleic acid anhydride plus terpinene of limonene or other unsaturated hydrocarbons of the terpene series. Other polybasic acid anhydrides within the contemplation of this invention are anhydrides of glutaric, sebacic, isosuccinic, tetrahydrophthalic, naphthalene-dicarboxylic, diglycolic, hemimellitic, trimellitic acids.

It has been pointed out that while the invention is not limited to the use of a catalyst, improved cures are sometimes obtained thereby. Generally speaking, any of the known catalysts which are activators for epoxide-carboxyl reactions can be used to increase the rate of cure of the compositions, for example, organic bases, tertiary amines, and quaternary ammonium hydroxides. Basic catalysts are generally used for this purpose, for example, alkali metal or alkali earth metal hydroxides and organic bases, such as sodium hydroxide, dimethylaminomethyl phenol and benzyl trimethyl ammonium hydroxide. These alkaline compounds are employed in catalytic quantities, say from 0.01 percent to 5.0 percent.

This invention can perhaps be best illustrated by means of examples. It is believed, however, that the examples can be better understood by first considering the preparation of particular glycidyl polyethers which are preferred for use in accordance with the invention.

PREPARATION OF GLYCIDYL POLYETHERS

Glycidyl polyether A

About 744 parts (3.26 mols) of 2,2-bis(4-hydroxyphenyl)propane and 223 parts (5.57 mols) of sodium hydroxide (20 percent excess) were combined in 1900 parts water and heated to about 29° C., whereupon 423 parts (4.5 mols) of epichlorhydrin were added rapidly. The temperature was increased and remained at about 93° C. for 90 minutes. The mixture was separated into a two phase system and the aqueous layer drawn off. The resinous layer that remained was washed with hot water and then drained and dried at a temperature of 140° C. The Durrans' mercury method melting point of the resulting glycidyl polyether was 80° C. and the weight per epoxide was about 586.

Glycidyl polyether B

In a flask equipped with a stirrer, condenser and thermometer were placed 330 grams (3 mols) of resorcinol, and 2775 grams (30 mols) of epichlorhydrin in 27 grams of water. To this mixture 250 grams of sodium hydroxide flakes were added slowly in two additions. First 165 grams were added and the flask was slowly heated. When the temperature reached 105° C., heat was withdrawn and the mixture was cooled in a water bath. When the temperature of the mixture decreased to 100° C., an additional 85 grams of sodium hydroxide were added, the mixture being continuously cooled because of the exothermic reaction. After the exotherm subsided, the material was distilled to remove the water. The flask was then cooled, 1000 cc. of benzene added, and the product filtered to remove the sodium chloride. The excess epichlorhydrin and other volatile matter were removed under vacuum. A pale amber, viscous liquid having a weight per epoxide of 143 was obtained.

Glycidyl polyether C

Following the example for the preparation of glycidyl polyether B, a glycidyl polyether was prepared using p,p'-dihydroxydiphenyl instead of resorcinol, the molar proportions as well as the procedure being the same as in the preceding example. The resulting glycidyl polyether was a white crystalline solid having a weight per epoxide of 153.

Glycidyl polyether D

About 1 mol of bisphenol was dissolved in 10 mols of epichlorhydrin and 1 to 2 percent water was added to the resulting mixture. The mixture was then brought to 80° C. and 2 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorhydrin was distilled off. The residue was combined with an approximately equal amount of benzene and the mixture filtered to remove the salt. The benzene was then removed to yield a viscous liquid having a weight per epoxide of 185.

Glycidyl polyether E

About 276 parts (3 mols) of glycerol were mixed with 832 parts (9 mols) of epichlorhydrin. To this reaction mixture were added 10 parts of diethyl ether solution containing about 4.5 percent boron trifluoride, according to U.S. Patent 2,581,464. The temperature of this mixture was between 50° C. and 75° C. for about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The resulting polyglycidyl ether was a pale yellow, viscous liquid. It had a weight per epoxide of 155.

PREPARATION OF RESINS

Using the glycidyl polyethers prepared in accordance with the above examples the preparation of the novel cured resins of this invention can now be illustrated, a cured resin being a resin changed from a soluble, fusible state to an insoluble, infusible state by chemical action. The following examples are, of course, intended to be illustrative only, since in the light of these examples variations and modifications will become obvious. In the examples the glycidyl polyether has been expressed in mols. For the purpose of the example, one mol was assumed to be two times the weight per epoxide.

EXAMPLE 1

Twenty grams (0.0174 mol) of glycidyl polyether A, 5.15 grams (0.0348 mol) phthalic acid anhydride, and 3.6 grams (0.011 mol) of 2,2-bis(p-2-hydroxy, 1-propoxyphenyl)propane, i.e.,

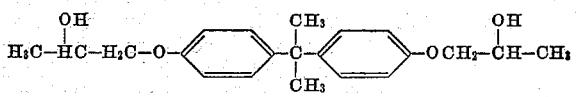

were heated together with stirring until a clear melt was obtained. Approximately 25 grams of the resulting mixture were then poured into an aluminum cup 2 inches in diameter. The cup was placed in a closed container so that none of the anhydride would be lost through volatilization, and curing was accomplished by heating the product at 180° C. for one hour. A well cured, tough, flexible resin was obtained which could not be altered by further heating.

EXAMPLE 2

Ten grams (0.0326 mol) of glycidyl polyether C, 9.6 grams (0.065 mol) of phthalic acid anhydride and 6.88 grams (0.020 mol) of 2,2-bis(p-2-hydroxy, 1-propoxyphenyl)propane were heated together with stirring until a clear melt was obtained. Approximately 25 grams of the resulting mixture were then poured into an aluminum cup 2 inches in diameter. The cup was placed in a closed container so that none of the anhydride would be lost through volatilization and curing was accomplished by heating the product at 200° C. for 1 hour. A hard, well cured, tough, flexible resin was obtained which was unaltered by further heating.

EXAMPLE 3

Ten grams (0.035 mol) of glycidyl polyether B, 10.36 grams (0.070 mol) of phthalic acid anhydride, and 7.2 grams (0.021 mol) of 2,2-bis(p-2-hydroxy, 1-propoxyphenyl)propane were heated together with stirring until a clear melt was obtained. Approximately 25 grams of the resulting mixture were then poured into an aluminum cup and placed in a closed container so that none of the anhydride would be lost through volatilization. Curing was accomplished by heating the product at 180° C. for 1 hour. A well cured resin, somewhat less flexible than the resin of Example 2 was obtained.

EXAMPLE 4

Ten grams (0.027 mol) of glycidyl polyether D, 20 grams (0.054 mol) of pyromellitic acid anhydride and 5.5 grams (0.016 mol) of di-2-hydroxypropyl ether of bisphenol were heated together with stirring until a clear melt was obtained. Approximately 25 grams of the resulting mixture were then poured into an aluminum cup 2 inches in diameter. The cup was placed in a closed container so that none of the anhydride would be lost through volatilization, and curing was accomplished by heating the product at 180° C. for 1 hours as in the preceding examples. The resin obtained was well cured but somewhat less flexible than the resin of Example 3.

EXAMPLE 5

Ten grams (0.027 mol) of glycidyl polyether D, 8 grams (0.054 mol) of phthalic acid anhydride and 2.5 grams (0.017 mol) of triethylene glycol were heated together with stirring until a clear melt was obtained. The mixture was cooled slightly and 0.20 gram of a tertiary amine catalyst (dimethylaminomethyl phenol) was added with stirring. Approximately 25 grams of this resulting mixture were poured into an aluminum cup 2 inches in diameter, and the cup was placed in the closed container so that none of the anhydride would be lost through volatilization. Curing was accomplished by heating the product at 200° C. for 1 hour. The resulting product was a well cured, tough, flexible resin.

EXAMPLE 6

Following the procedure of Example 5 resins were prepared using various mol ratios of glycidyl polyether, phthalic acid anhydride and dihydric alcohol. The mols of each ingredient are given in the table below. Glycidyl polyether D was employed with phthalic acid anhydride and 2,2-bis(p-2-hydroxy, 1-methyl, 1-propoxyphenyl)propane, i.e.,

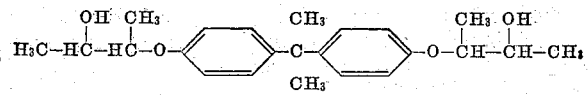

The dihydric alcohol, 2,2-bis(p-2-hydroxy, 1-methyl, 1-propoxyphenyl)propane, was prepared as follows. Bisphenol (228 grams), toluene (220 grams), and benzyltrimethyl ammonim hydroxide (3 grams) were charged into a 1 liter flask and heated to 100° C. At this point, the dropwise addition of 2-butene oxide began. After 2 hours approximately 100 grams of the epoxide had been added and the reaction appeared to have stopped. The unreached butene oxide and toluene were distilled off and the product was dissolved in 300 ml. of methyl isobutyl ketone. The resin solution was extracted with 400 ml. of 10 percent sodium hydroxide and then 400 ml. of water. The organic layer was separated and the methyl isobutyl ketone was vacuum distilled. The product was a clear, amorphous, semi-solid weighing 121 grams. In this example dimethylaminomethyl phenol was employed as a catalyst, 1 percent by weight being used in each preparation. The ratios of glycidyl polyether to phthalic acid anhydride to the dihydric alcohol as well as the properties of resulting resins are given in the following table, the numbers being mols of each ingredient.

| Glycidyl Polyether | Anhydride | Dihydric Alcohol | Properties |
|---|---|---|---|
| 0.025 | 0.050 | 0.019 | Brittle, slightly flexible. |
| 0.025 | 0.050 | 0.016 | Somewhat brittle, tough. |
| 0.025 | 0.050 | 0.013 | No brittleness, tough, and flexible. |

EXAMPLE 7

Ten grams of glycidyl polyether E, 9.8 grams of phthalic acid anhydride, and 6.5 grams of the di-2-hydroxypropyl ether of bisphenol were heated together until a clear melt was obtained. As in the above examples, a sample of about 25 grams was cured by heating the product at 180° C. for 1 hour. There was obtained a well cured but somewhat brittle resin which could not be altered by further heating.

EXAMPLE 8

Following the procedure of Example 1 resins were prepared using various mol ratios of glycidyl polyether, phthalic acid anhydride and dihydric alcohol. The mols of each ingredient used and properties of resulting resins are given in the table below. Glycidyl polyether B was employed with phthalic acid anhydride and dipropylene glycol. As a catalyst, 1 percent by weight dimethylaminomethyl phenol was employed in this example.

| Glycidyl Polyether | Anhydride | Dihydric Alcohol | Properties |
|---|---|---|---|
| 0.027 | 0.054 | 0.022 | Poorly cured and brittle. |
| 0.027 | 0.054 | 0.019 | Cured and only slightly flexible. |
| 0.027 | 0.054 | 0.015 | Well cured, tough and flexible. |
| 0.027 | 0.054 | 0.011 | Well cured and flexible. |

EXAMPLE 9

Following the procedure of Example 1 resins were prepared using various mol ratios of glycidyl polyether, phthalic acid anhydride and dihydric alcohol. The mols of each ingredient used are given in the table below. Glycidyl polyether D was employed with phthalic acid anhydride and triethylene glycol. As before, in the preparation of these resins one percent by weight of dimethylaminomethyl phenol was employed as catalyst.

| Glycidyl Polyether | Anhydride | Dihydric Alcohol | Properties |
|---|---|---|---|
| 0.027 | 0.054 | 0.020 | Brittle and poorly cured. |
| 0.027 | 0.054 | 0.017 | Flexible, tough and well cured. |
| 0.027 | 0.054 | 0.013 | Do. |
| 0.027 | 0.054 | 0.010 | Do. |

EXAMPLE 10

Following the procedure of Example 1 resins were prepared using various mol ratios of glycidyl polyether, phthalic acid anhydride and dihydric alcohol. The mols of each ingredient used are given in the table below. Glycidyl polyether C was employed with phthalic acid anhydride and the diethylene glycol. Again dimethylaminomethyl phenol was employed as catalyst, 1 percent by weight being used.

| Glycidyl Polyether | Anhydride | Dihydric Alcohol | Properties |
|---|---|---|---|
| 0.027 | 0.054 | 0.019 | Slightly flexible but poorly cured. |
| 0.027 | 0.054 | 0.0165 | Flexible, tough and well cured. |
| 0.027 | 0.054 | 0.013 | Do. |
| 0.027 | 0.054 | 0.011 | Do. |

EXAMPLE 11

Using a mol ratio of glycidyl polyether to anhydride to dihydric alcohol of 1:2:0.5, a resin was prepared using 0.027 mol of glycidyl polyether C, 0.054 mol of phthalic acid anhydride and 0.0135 mol of polyoxyethylene glycol having a molecular weight of 300. As a catalyst 0.22 gram of dimethylaminomethyl phenol was used. A tough, flexible, well cured resin was obtained.

EXAMPLE 12

Using a mol ratio of glycidyl polyether to anhydride to dihydric alcohol of 1:2:0.5, a resin was prepared using 0.027 mol of glycidyl polyether C, 0.054 mol of phthalic acid anhydride and 0.0135 mol of polyoxyethylene glycol having a molecular weight of 400. As a catalyst, 1 percent by weight of dimethylaminomethyl phenol was used. The resin prepared by this example was well cured but appeared softer than the resin of Example 11.

EXAMPLE 13

In accordance with Example 4, and using glycidyl polyether D and 2,2-bis(p-2-hydroxy,1-propoxyphenyl)propane, 4 cured resins were obtained using varied proportions of reactants as here tabulated:

| Glycidyl Polyether | | Anhydride | | Dihydric Alcohol | | Catalyst, grams |
|---|---|---|---|---|---|---|
| grams | mols | grams | mols | grams | mols | |
| 25 | 0.068 | 10 | 0.068 | 3.6 | 0.0104 | 0.39 |
| 25 | .068 | 10 | .068 | 8.7 | .0253 | .44 |
| 25 | .068 | 10 | .068 | 15 | .044 | .50 |
| 25 | .068 | 15 | .101 | 10 | .029 | .50 |

In each case phthalic anhydride was used as the acid anhydride and dimethylaminomethyl phenol was used as the catalyst.

EXAMPLE 14

Using a mol ratio of glycidyl polyether to dibasic acid anhydride to dihydric alcohol of 1:2:0.5, a cured resin was obtained using "Chlorendic"[1] anhydride. In accordance with Example 5, 10 parts (0.027 mol) of glycidyl polyether D, 20 grams (0.054 mol) of "Chlorendic"[1] anhydride, along with 5.2 grams (0.135 mol) of 2,2-bis (p-2-hydroxy,1-propoxyphenyl)propane were heated together using about 1 percent of the catalyst. The resin was cured in the shallow aluminum cup as in Example 5.

The above examples illustrate that desirable, well cured resins containing a maximum amount of glycol are prepared using 2 epoxide equivalents (assumed to be 1 mol) of glycidyl polyether to 2 mols of anhydride to not more than about 0.7 mol of dihydric alcohol. The examples also show that excellent, well cured resins are obtained by using lower quantities of the low molecular weight dihydric alcohol. The resins of this invention, prepared by the use of low molecular weight dihydric alcohol, have better flexibility than the same glycidyl polyether cured with phthalic acid anhydride alone. There are also differences in stress-strain properties, impact strength, heat distortion and the like. Chemically the modified resinous compositions of the invention differ from resins which are not modified by the use of a dihydric alcohol in that resins of this invention have a high hydroxyl content, which is equal to the amount of dihydric alcohol hydroxyl added, while unmodified resins do not.

In addition to advantages in properties the incorporation of low molecular weight dihydric alcohols into anhydride cured epoxide resins has a distinct economic advantage over the unmodified resins. Not only are most of the dihydric alcohols relatively inexpensive, but when a maximum amount of the dihydric alcohol is used, the amount of anhydride which can be used is also greater than when anhydride alone is employed so that the percent epoxide resin in the final product is considerably smaller than in the resin not so modified.

The new resins which are products of the process of this invention are particularly advantageous for use in the fields of molding, paints, varnishes, potting and the like, principally for heat hardening plastics, heat hardening varnishes, enamels and other coatings, electrical insulation, and castings. A particularly important advantage of the invention is that the dihydric alcohols function as fluidizing agents. Thus, by the addition of the dihydric alcohol, a viscous glycidyl polyether is made more fluid

[1] Trademark.

and hence easier to use before curing, for example, during compounding or fabrication stages.

Other uses and embodiments of the invention will occur to those skilled in the art. For example, the resins of this invention can have certain additional materials incorporated with them to alter or improve some property, or to make them more easily molded. Among the materials which can be added are fillers such as finely divided wood flour, cotton flock, mica, and asbestos; coloring materials such as pigments; thinners which will enable the formation of thin coatings for protection of such materials as metal; plasticizers to aid in adapting the resins to different uses or to impart to them somewhat different properties; and small amounts of other materials which may hasten curing. Such embodiments may be made without departing from the spirit and scope of this invention.

What is claimed is:

1. A process for preparing a resinous composition of matter which comprises (a) forming a mixture of (1) a glycidyl polyether of a polyhydric organic compound selected from the group consisting of polyhydric alcohols and phenols containing at least two hydroxyl groups, the glycidyl polyether containing more than one epoxide group per molecule and having an epoxide equivalent below 1,000, (2) a polycarboxylic acid anhydride, and (3) a dihydric alcohol having a molecular weight of less than 600, wherein the ratio of glycidyl polyether to alcohol is 2 epoxide equivalents glycidyl polyether to 0.02 to 1.4 equivalents dihydric alcohol, and wherein the ratio of anhydride to alcohol is such that there is one anhydride equivalent for each hydroxyl equivalent of the alcohol and .5 to 1.9 additional anhydride equivalents for reaction with hydroxyl group of the glycidyl polyether and those formed by reaction of carboxyl groups with epoxy groups, considering an epoxide equivalent as the weight in grams of glycidyl polyether per epoxide group, an anhydride equivalent as the weight of acid anhydride in grams per anhydride group, and an equivalent dihydric alcohol as the weight in grams of alcohol per hydroxyl group, and (b) heating the mixture to 80° to 200° C. to bring about a reaction of anhydride groups with hydroxyl groups forming carboxyl groups, and a reaction of carboxyl groups with epoxy groups forming hydroxyl groups.

2. A heat-convertible resinous composition of matter particularly adapted for the formation of shaped articles comprising (1) a glycidyl polyether of a polyhydric organic compound selected from the group consisting of polyhydric alcohols and phenols containing at least two hydroxyl groups, the glycidyl polyether containing more than one epoxide group per molecule and having an epoxide equivalent below 1,000 (2) a polycarboxylic acid anhydride, and (3) a dihydric alcohol having a molecular weight of less than 600, wherein the ratio of glycidyl polyether to alcohol is 2 epoxide equivalents glycidyl polyether to 0.02 to 1.4 equivalents dihydric alcohol, and wherein the ratio of anhydride to alcohol is such that there is one anhydride equivalent for each hydroxyl group of the alcohol and .5 to 1.9 additional anhydride equivalents, considering an epoxide equivalent as the weight in grams of glycidyl polyether per epoxide group, an anhydride equivalent as the weight of acid anhydride in grams per anhydride group, and an equivalent of dihydric alcohol as the weight in grams of dihydric alcohol per hydroxyl group.

3. The process of claim 1 wherein the polycarboxylic acid anhydride is a dicarboxylic acid anhydride and wherein the ratio of glycidyl polyether to dicarboxylic acid anhydride to dihydric alcohol is one to 1 to 0.6, the glycidyl polyether, the anhydride and the alcohol being expressed in equivalents.

4. The process of claim 1 wherein the glycidyl polyether is a diglycidyl ether of 2,2-bis(p-hydroxyphenyl) propane, having an epoxide equivalent of 170 to 250, wherein the polycarboxylic acid anhydride is phthalic acid anhydride, wherein the dihydric alcohol is 2,2-bis(p-2-hydroxy,1-propoxyphenyl)propane and wherein the ratio of glycidyl polyether to phthalic acid anhydride to dihydric alcohol is 1 to 0.9 to 0.4, the glycidyl polyether, the anhydride and the dihydric alcohol being expressed in equivalents.

5. A cross-linked infusible resinous reaction product resulting from the process of claim 1.

6. A cross-linked infusible resinous reaction product resulting from the process of claim 4.

References Cited in the file of this patent

UNITED STATES PATENTS

| | | |
|---|---|---|
| 2,324,483 | Castan | July 20, 1943 |
| 2,683,131 | Cass | July 6, 1954 |
| 2,712,535 | Fisch | July 5, 1955 |
| 2,731,444 | Greenlee | Jan. 17, 1956 |

FOREIGN PATENTS

| | | |
|---|---|---|
| 133,819 | Australia | July 15, 1946 |

Notice of Adverse Decision in Interference

In Interference No. 92,515 involving Patent No. 2,947,717, W. J. Belanger and J. E. Masters, EPOXIDE RESIN COMPOSITIONS, final judgment adverse to the patentees was rendered Oct. 16, 1964, as to claims 1, 2, 3 and 5.
[*Official Gazette February 23, 1965.*]